(12) United States Patent
Arimilli et al.

(10) Patent No.: US 6,314,498 B1
(45) Date of Patent: Nov. 6, 2001

(54) MULTIPROCESSOR SYSTEM BUS TRANSACTION FOR TRANSFERRING EXCLUSIVE-DEALLOCATE CACHE STATE TO LOWER LEVER CACHE

(75) Inventors: Ravi Kumar Arimilli; Lakshminarayana Baba Arimilli, both of Austin; John Steven Dodson, Pflugerville; Guy Lynn Guthrie; William John Starke, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,197

(22) Filed: Nov. 9, 1999

(51) Int. Cl.$^7$ ...................................................... G06F 12/08
(52) U.S. Cl. ............................ 711/144; 711/122; 711/138
(58) Field of Search ..................................... 711/122, 135, 711/133, 141, 143, 144, 145, 138

(56) References Cited

U.S. PATENT DOCUMENTS 6,148,375 * 11/2000 Baylor et al. .......................... 711/130
6,240,490 * 5/2001 Lyles, Jr. et al. ..................... 711/141
6,247,098 * 6/2001 Arimilli et al. ...................... 711/141

* cited by examiner

*Primary Examiner*—Hiep T. Nguyen
(74) *Attorney, Agent, or Firm*—Casimer K. Salys; Bracewell & Patterson, L.L.P.

(57) ABSTRACT

A cache coherency protocol uses a "Exclusive-Deallocate" ($E_D$) coherency state to indicate that a particular value is currently held in an upper level cache in an exclusive, unmodified form (not shared with any other caches of the computer system, including caches associated with the same processing unit), so that the value can conveniently be modified without any lower level bus transactions since no lower level caches have allocated a line for the value. If the value is subsequently modified in the upper level cache, its coherency state is simply switched to "modified" without the need for any bus transactions. Conversely, if the value is evicted from the upper level cache without ever having been modified, it can be loaded into the lower level cache with a coherency state indicating that the lower level cache contains the unmodified value exclusive of all other caches in other processing units of the computer system. If the value is initially loaded into the upper level cache from a cache of another processing unit, or from a lower level cache of the same processing unit, then the upper level cache may be selectively programmed to mark the cache line with the $E_D$ state.

20 Claims, 4 Drawing Sheets

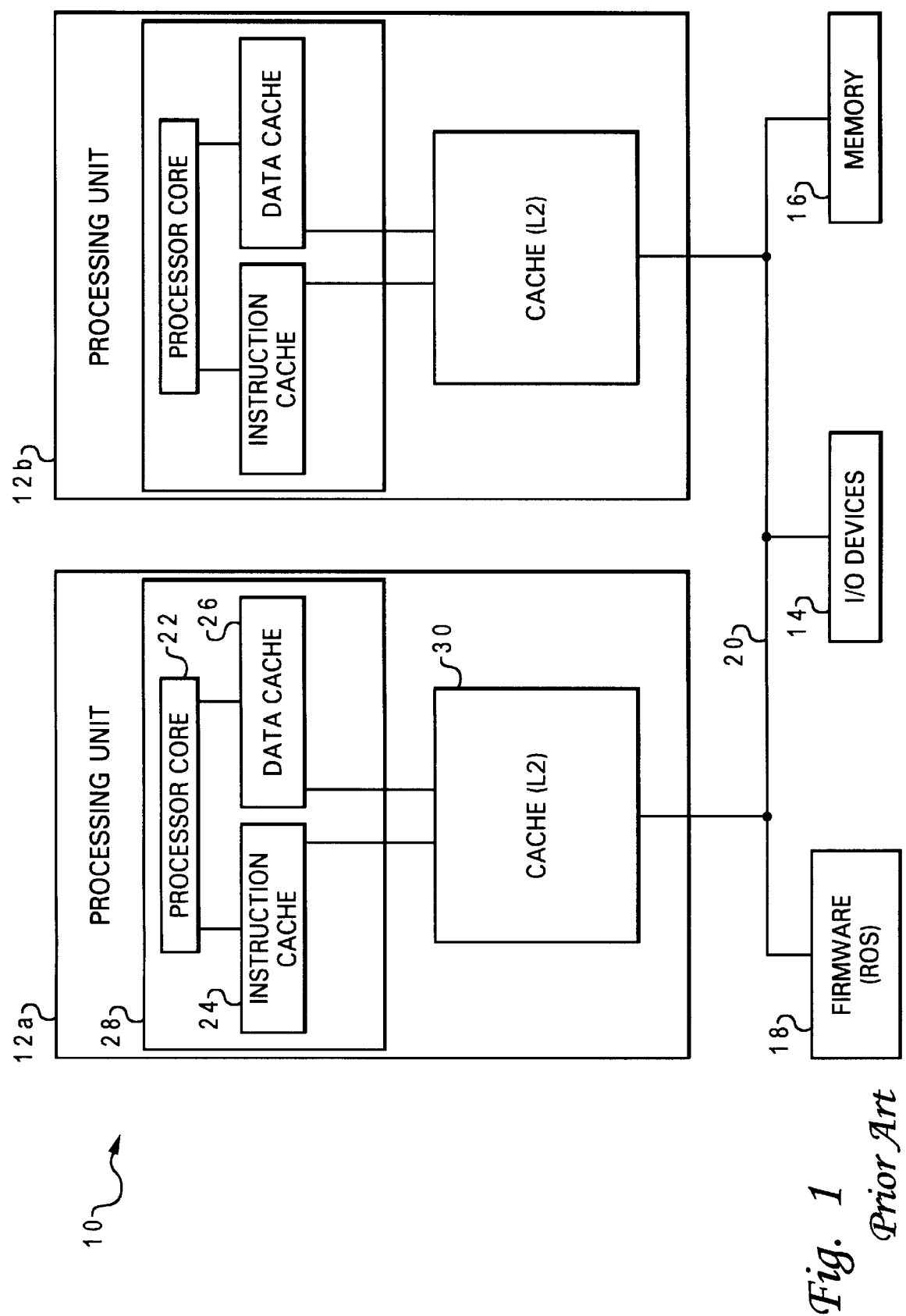
Fig. 1 *Prior Art*

Upper Level Cache

MULTIPROCESSOR SYSTEM BUS TRANSACTION FOR TRANSFERRING EXCLUSIVE-DEALLOCATE CACHE STATE TO LOWER LEVER CACHE

CROSS-REFERENCE TO RELATED APPLICATION

The present invention is related to U.S. patent application Ser. No. 09/437,198 entitled "HIGH PERFORMANCE MULTIPROCESSOR SYSTEM WITH EXCLUSIVE-DEALLOCATE CACHE STATE" (attorney docket no. AT9-99-618), filed concurrently herewith.

BACKGROUND OF THE INVENTION

1. Field of the Invention

The present invention generally relates to computer systems, and more particularly to a cache coherency protocol which provides a novel mechanism for handling data in a multi-level (vertical) cache hierarchy, resulting in improved cache usage and the reduction of bus traffic between cache levels when a value contained in an upper level cache is modified from a store operation issued by a processor core associated with the upper level cache.

2. Description of the Related Art

The basic structure of a conventional multi-processor computer system 10 is shown in FIG. 1. Computer system 10 has several processing units, two of which 12a and 12b are depicted, which are connected to various peripheral devices, including input/output (I/O) devices 14 (such as a display monitor, keyboard, graphical pointer (mouse), and a permanent storage device (hard disk)), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct memory access channels (not shown). Computer system 10 may have many additional components which are not shown, such as serial, parallel, and universal system bus (USB) ports for connection to, e.g., modems or printers. There are other components that might be used in conjunction with those shown in the block diagram of FIG. 1; for example, a display adapter might be used to control a video display monitor, a memory controller can be used to access memory 16, etc. The computer can also have more than two processing units.

In a symmetric multi-processor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the additional latency of loading the values from memory 16. These caches are referred to as "on-board" when they are integrally packaged with the processor core on a single integrated chip 28. Each cache is associated with a cache controller (not shown) that manages the transfer of data and instructions between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In an SMP computer, it is important to provide a coherent memory system, that is, to cause write operations to each individual memory location to be serialized in some order for all processors. For example, assume a location in memory is modified by a sequence of write operations to take on the values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent". Nearly all coherency protocols operate only to the granularity of the size of a cache block. That is to say, the coherency protocol controls the movement of and write permissions for operand data or instructions on a cache block basis, and not separately for each individual memory location.

There are a number of protocols and techniques for achieving cache coherence that are known to those skilled in the art. All of these mechanisms for maintaining coherency require that the protocols allow only one processor to have a "permission" that allows a write operation to a given memory location (cache block) at any given point in time. As a consequence of this requirement, whenever a processing element attempts to write to a memory location, it must first inform all other processing elements of its desire to write the location and receive permission from all other processing elements to carry out the write.

To implement cache coherency in a system, the processors communicate over a common generalized interconnect (i.e., bus 20). The processors pass messages over the interconnect indicating their desire to read from or write to memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one or more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, e.g., the L3 cache. If the block is not present in the lower level caches, the request is then presented on the generalized interconnect (20) to be serviced. Once an operation has been placed on the generalized interconnect, all other processing units snoop the operation and determine if the block is present in their caches. If a given processing unit has the block requested by processing unit in its L1 cache, and the value in that block is modified, and any lower level caches also have copies of the block, then their copies are stale, since the copy in the processor's cache is modified. Therefore, when the lowest level cache (e.g., L3) of the processing unit snoops the read operation, it will determine that the block requested is present and modified in a higher level cache. When this occurs with an in-line cache structure, the L3 cache places a message on the generalized interconnect informing the processing unit that it must "retry" it's operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified value from the L1 cache and make it available at the L3 cache, main memory or both, depending on the exact details of the implementation. To retrieve the block from the higher level caches, the L3 cache sends messages through the inter-cache connections to the higher level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually re-presents the read request on the generalized interconnect. At this point, however, the modified value has been retrieved from the L1 cache of a processing unit and placed into system memory, and the read request from the initiating processor will be satisfied. The scenario just described is commonly referred to as a "snoop push". A read request is snooped on the generalized interconnect which causes the processing unit to "push" the block to the bottom of the hierarchy to satisfy the read request made by the initiating processing unit.

Thus, when a processor wishes to read or write a block, it must communicate that desire with the other processing units in the system in order to maintain cache coherence. To achieve this, the cache coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read it receives a message indicating whether or not the read must be retried (i.e., reissued later). If the read operation is not retried, the message usually also includes information allowing the processing unit to determine if any other processing unit also has a still active copy of the block (this is accomplished by having the other lowest level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive". If a block is marked exclusive it is permissible to allow the processing unit to later write the block without first communicating with other processing units in the system because no other processing unit has a copy of the block. Therefore, it is possible for a processor to read or write a location without first communicating this intention onto the interconnection, but only where the coherency protocol has ensured that no other processor has an interest in the block.

The foregoing cache coherency technique is implemented in a specific protocol referred to as "MESI," and illustrated in FIG. 2. In this protocol, a cache block can be in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified value has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a sector is Invalid, it indicates that the addressed sector is not resident in the cache. As seen in FIG. 2, if a sector is in any of the Modified, Shared or Invalid states, it can move between the states depending upon the particular bus transaction. While a sector in an Exclusive state can move to any other state, a sector can only become Exclusive if it is first Invalid.

A further improvement in accessing cache blocks can be achieved using the cache coherency protocol. This improvement, referred to as "intervention," allows a cache having control over a memory block to provide the data in that block directly to another cache requesting the value (for a read-type operation), in other words, bypassing the need to write the data to system memory and then have the requesting processor read it back again from memory. Intervention can generally be performed only by a cache having the value in a block whose state is Modified or Exclusive. In both of these states, there is only one cache block that has a valid copy of the value, so it is a simple matter to source (write) the value over the bus 20 without the necessity of first writing it to system memory. The intervention procedure thus speeds up processing by avoiding the longer process of writing to and reading from system memory (which actually involves three bus operations and two memory operations). This procedure not only results in better latency, but also increased bus bandwidth.

There are many variations of the MESI protocol. For example, the tagged ("T") state is used to identify a cache block which is inconsistent with system memory (i.e., modified) and is further responsible for writing the correct (current) value to memory upon deallocation (or to pass on the tag to another cache block during intervention). The T state can be used to share a modified value, by marking one of the sharing blocks as (temporarily) responsible for maintaining a valid copy of the value. The recently read ("R") state can be used to allow intervention when the value is unmodified but shared among many caches, so as to conveniently mark a single one of the sharing caches as being responsible for intervention. The hover ("H") state allows a cache line to maintain an address in the directory even though the corresponding value in the cache entry array is an invalid copy, so that it can snoop the correct value for its processing unit if the value happens to be broadcast as part of an intervention between the caches of two other processing units.

In a multi-level cache, if a copy of a value is in every level of the cache, the cache hierarchy is referred to as being "inclusive." It is not necessary, however, to keep a copy of each value in the lower levels, and an inclusivity bit field may be added to the caches to indicate whether or not the cache is inclusive. For example, a three-level cache structure might provide an L3 cache which was not inclusive, such that a value residing in the L2 cache might not be present in the L3 cache. In this example, if an L2 cache issues a read command for a value that is not present in any of the caches of that processing unit, it can be passed to that L2 cache without (necessarily) loading it into the L3 cache. If the value was read from system memory, it will be set in the E (exclusive) state.

In many instances, a value that is read into a cache (and set to an exclusive state) will be modified shortly thereafter. Since an upper level cache does not know whether a lower level cache has a copy of a value being modified, it is necessary to issue a bus transaction to the lower level cache(s) to signal that the value has been modified, which can lead to excess bus traffic. A bus transaction to invalidate an L3 cache line (such as the DClaim operation of the PowerPC instruction set) further may take as long as 100 processor cycles to complete, which can ultimately delay processing. If a line is in the shared state in the upper level cache, then the upper level cache could presume that a DClaim was necessary as at least one copy of the line would necessarily be residing in another cache. However, if the line is in the exclusive state in the upper level cache, there may or may not be a copy in the lower level cache, so the DClaim might be totally unnecessary. It would, therefore, be desirable to devise a method of maintaining cache coherency which allowed an upper level cache to recognize that a lower level cache had not allocated a block for a particular value, so that the upper level cache could determine whether it was really necessary to issue a bus transaction to a lower level cache upon modification of a value stored in the upper level cache. It would be further advantageous if the method could utilize a cache structure that avoided snoop filtering through the cache levels.

SUMMARY OF THE INVENTION

It is therefore one object of the present invention to provide an improved method of maintaining cache coherency in a multi-processor computer system.

It is another object of the present invention to provide such a method for a multi-level cache hierarchy that allows an upper level cache to avoid unnecessary bus transactions to a lower level cache.

It is yet another object of the present invention to provide a method of more efficiently using a non-inclusive, multi-level cache hierarchy.

The foregoing objects are achieved in a method of maintaining cache coherency in a multi-processor computer system, using a "Exclusive-Deallocate" ($E_D$) coherency state to indicate that a particular value is currently held in an upper level cache in an exclusive, unmodified form (i.e., consistent with system memory and not shared with any other caches of the computer system, including caches associated with the same processing unit), so that the value can conveniently be modified without any lower level bus transactions since no lower level caches have allocated a line for the value. If the value is subsequently modified in the upper level cache, its coherency state is simply switched to "modified" without the need for any bus transactions; if the modified value is evicted from the upper level cache, it can be loaded into a lower level cache with the modified coherency state. Conversely, if the value is evicted from the upper level cache without ever having been modified, it can be loaded into the lower level cache with a coherency state indicating that the lower level cache contains the unmodified value exclusive of all other caches in other processing units of the computer system. The value can be initially loaded into the upper level cache from a system memory device, from a cache of another processing unit, or from a lower level cache of the same processing unit. In the latter two cases, the upper level cache may be selectively programmed to mark the cache line with the $E_D$ state. In a preferred embodiment, each processing unit has at least three cache levels, including a lower level lookaside cache.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 1 is a block diagram of a prior-art multi-processor computer system;

DESCRIPTION OF PREFERRED EMBODIMENT

Figure 3:
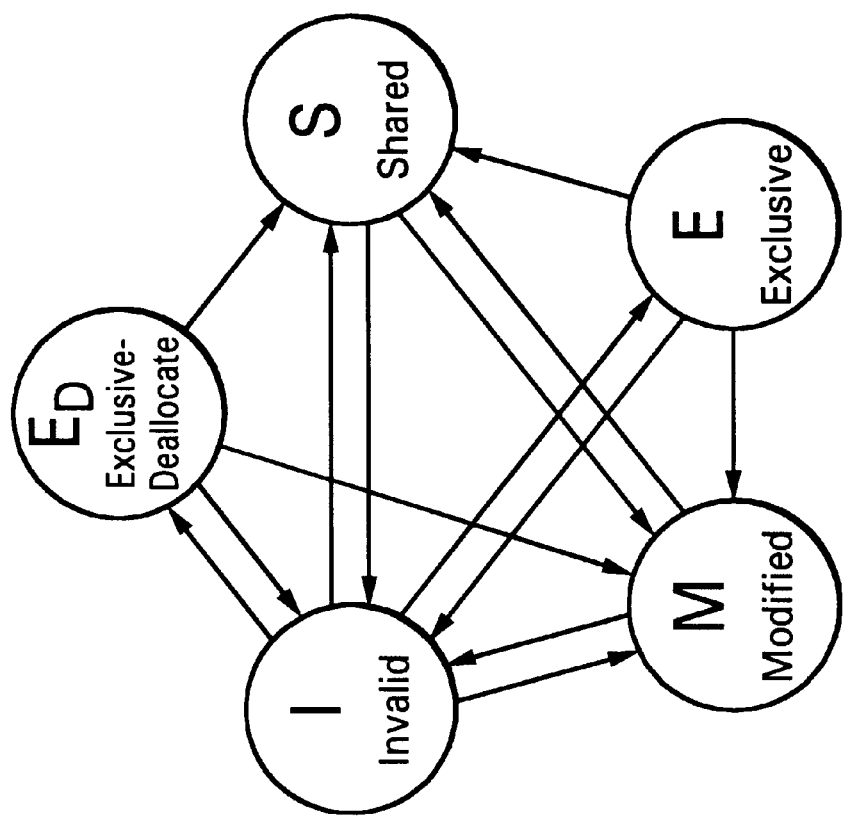
FIG. 3 is a state diagram depicting the cache coherency protocol of the present invention, providing a novel coherency state ($E_D$) used by an upper level cache to allow the cache to modify a value as a result of a store operation without issuing a bus transaction to any lower levels of the memory hierarchy.
Figure 2:
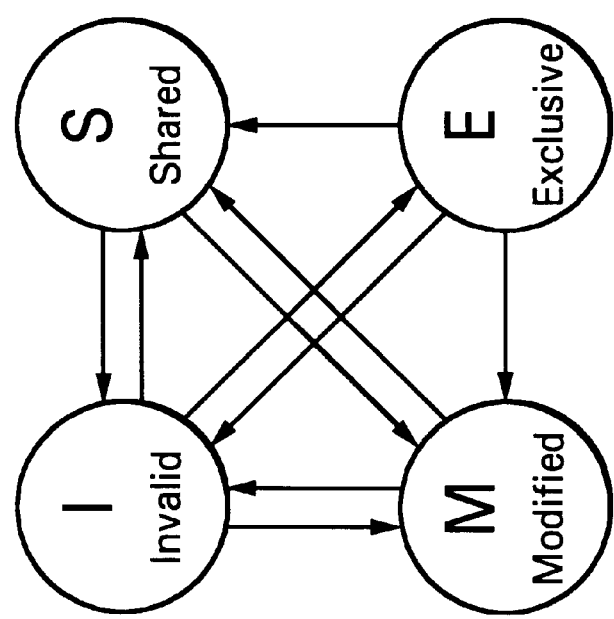
FIG. 2 is a state diagram depicting a prior art cache coherency protocol (MESI)

With reference now to FIG. 3, there is depicted a state diagram of one embodiment of the cache coherency protocol of the present invention. This protocol is similar to the prior art MESI protocol of FIG. 2, in that it includes the same four prior states (Modified, Exclusive, Shared and Invalid), but it also includes a new "$E_D$" state (Exclusive-Deallocate), for providing an indication that an upper level cache of a processing unit exclusively holds an unmodified value (even to the exclusion of other lower levels caches associated with the same processing unit), so that the value may be modified in that cache without the necessity of issuing a bus transaction to lower levels of the memory hierarchy.

If a processor core executes a read operation and an upper level cache does not currently contain the requested value, the upper level cache passes the read operation to the remainder of the memory hierarchy to obtain the value. The value might be in the next lower level cache and, if so, it is provided directly by the lower level cache. According to one implementation of the present invention, however, if the value is not currently in a lower level cache, it is retrieved from system memory and loaded into the upper level cache with the $E_D$ state, but not loaded into any lower level caches (i.e., those below the requesting cache). Thus, when the same processor core issues a subsequent store instruction to the same address, the $E_D$ state provides an indication to the upper level cache that the value is not currently contained in any other caches within the memory hierarchy. Accordingly, the upper level cache is free to store the modified value, and switch the state of its cache line from $E_D$ to M without issuing any bus transactions, as there is no need to deallocate any cache line(s) in the lower level cache(s).

In contrast, in the prior art, it would be necessary to issue a deallocation request (e.g., DClaim operation) to the lower level cache which might contain the value (and which would definitely contain the value if the cache hierarchy were inclusive). In the prior art, a lower level cache containing the value must be updated or else it might send an improper snoop response to another processing unit, or it might intervene with old (stale) data. The invention thereby substantially reduces bus traffic resulting from store operations at upper level caches.

Instead of providing a read value to an upper level cache from system memory, it could be provided by an intervening cache of another processing unit. In the latter case, the invention contemplates the option of either marking the read value in the upper level cache as shared (S), or marking it as $E_D$. It may be desirable to use the S state so as to maintain copies of the value in the other cache(s); the S state is shown for this reason in FIG. 3. Likewise, an upper level cache containing a value in the $E_D$ state which intervenes the value can switch to S. If, however, the $E_D$ state is used for intervened data, it is necessary to deallocate the line from the other cache(s) that previously contained it. For certain applications it can be beneficial to use the $E_D$ state after cache intervention in spite of the requirement to concurrently deallocate the other caches; if a store operation subsequently occurs, the other lines would have to be deallocated anyway. The alternative use of the S or $E_D$ states (at an upper level cache) for intervened data can be programmable, via software (e.g., hint bits contained within the store instruction, or a software programmable flag) or via hardware (e.g., by monitoring cache operations to determine usage patterns). Even if not used at the upper level cache, the S state could still be used by lower level caches.

As mentioned above, the invention can be implemented to allow an upper level cache requesting a read value to simply obtain it from a lower level cache of the same processing unit. If the lower level cache contained the value in the S state, then the upper level copy can also be set to the S state (this may be optional as noted above). A lower level cache might contain a line in the S state if that cache had previously read the line from the cache of another processing unit (i.e., the lower level cache benefitted from intervention), or if that cache had previously supplied the line to the cache of another processing unit (i.e., the lower level cache intervened). If the lower level cache instead contained the value in the E state, then the requesting upper level cache could set its line to E as well (as shown in FIG. 3), and not to $E_D$, since it might be preferred to retain the advantages of being able to load values from adjacent caches, rather than gaining the marginal benefit of further reducing bus transactions by deallocating a lower level cache line when it supplies the value to an upper level cache. This characteristic could also be programmable.

When using the $E_D$ protocol, a lower level cache will not load a value directly from the system memory device and set the line to exclusive if the value was supplied as a result of a read operation passed from a higher level cache; however, there are other ways that a lower level cache might obtain a value with an E state. If an upper level cache has the value in the $E_D$ state and deallocates the line (e.g., as the result of victimization), then the value will be pushed to the next lower cache and can be set to E there (it could optionally be set to $E_D$). Also, a lower level cache might make requests independent of an upper level cache (e.g., using prefetching) so that a value is not immediately loaded into the upper level cache, in which case it could again be set with the E state at the lower level.

There are other approaches to avoiding bus transactions that would not require an additional coherency state, but they have considerable drawbacks. For example, the cache line could simply be marked as modified (M) when it is first retrieved into the cache, so that a later store operation would not require changing the coherency state. However, since the value may not be truly modified when first received, if it were later evicted from the upper level cache before any store operation occurred, then the M state would be applied to the lower level cache as well. Later, this could unnecessarily force the value to be further written to a lower level of the memory hierarchy, thereby adding to bus traffic. Alternatively, the exclusive (E) state could be used to indicate that no lower level caches contain the value, but this would prevent the benefits noted above regarding the ability to simply read a requested value from the next cache down.

Figure 4:
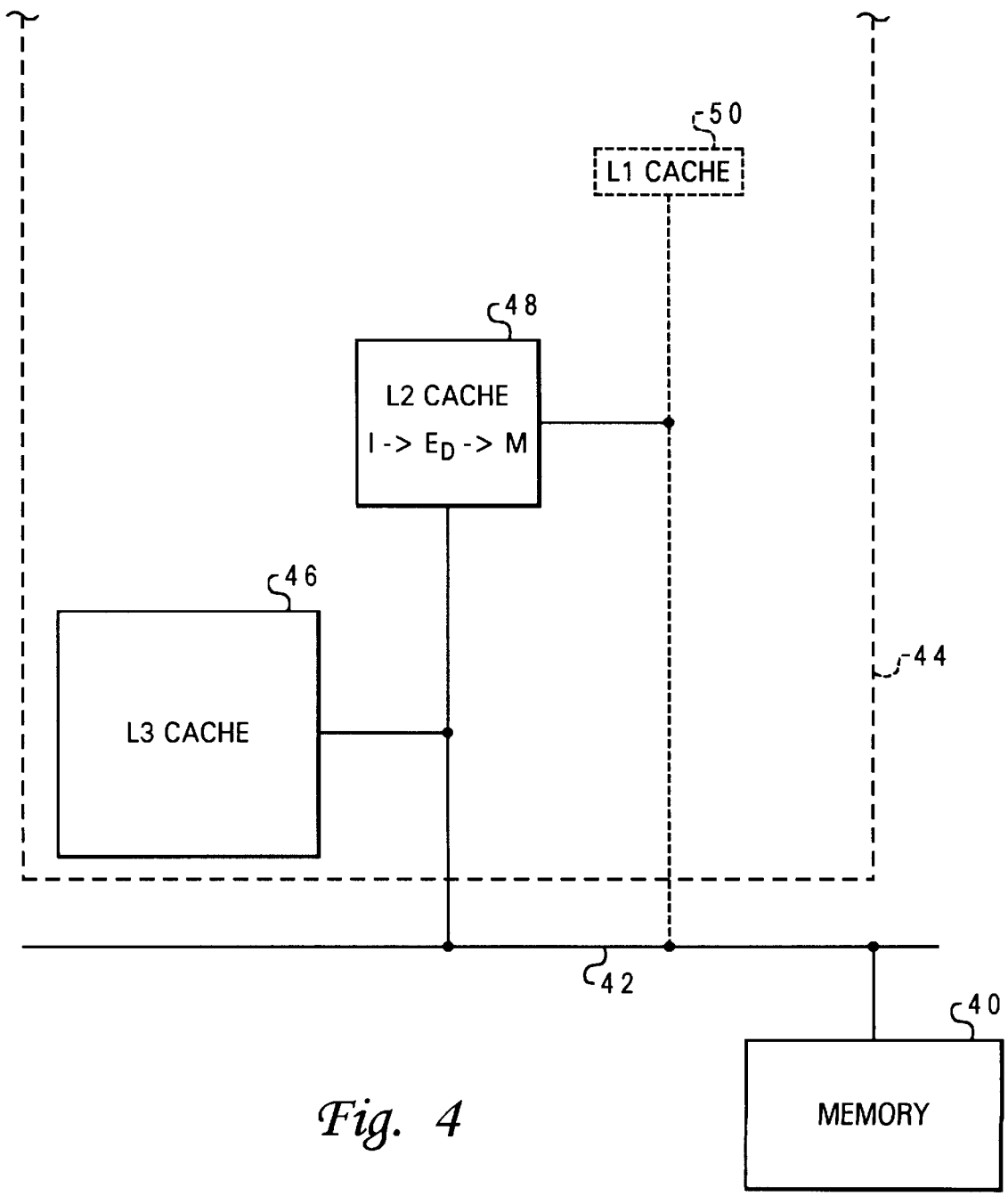
FIG. 4 is a block diagram illustrating one implementation of the invention with an L2 (upper) cache and an L3 (lower) lookaside cache.

FIG. 4 illustrates one embodiment of a memory hierarchy for a computer system in which the present invention can be practiced, but the invention could be applied to computer systems having new hardware components not shown in FIG. 4, or have other interconnection architectures, so those skilled in the art will appreciate that the present invention is not limited to the generalized system shown in that figure. In this embodiment, the hierarchy includes a system memory device 40 connected via a system bus 42 to a plurality of processing units, one of which 44 is depicted. Processing unit 44 includes an L3 cache 46 and an L2 cache 48. In this embodiment, the L2 cache is 512 kilobytes, and the L3 cache is lookaside, with four megabytes, and not inclusive. As seen in FIG. 4, when a cache line is read from memory device 40 in response to a read operation from L2 cache 48, the line goes from invalid (I) to exclusive-deallocate ($E_D$). Thereafter, when a store operation hits L2 cache 48, the line goes from exclusive-deallocate to modified (M), without any bus transactions between L2 cache 48 and L3 cache 46.

Those skilled in the art will further appreciate that the terms "lower" and "upper" are relative, i.e., upper is not necessary the L1 cache, and lower is not necessarily the L2 cache. Thus, the protocol of FIG. 3 might apply to any "upper level" in the memory hierarchy, e.g., the highest level cache (the on-board L1 instruction and data caches) or some intermediate cache level. The novel protocol could be used with some, but not all upper levels. For example, it could be applied to an L1 cache 50 shown in FIG. 4 in addition to using the protocol with L2 cache 48.

Figure 5:
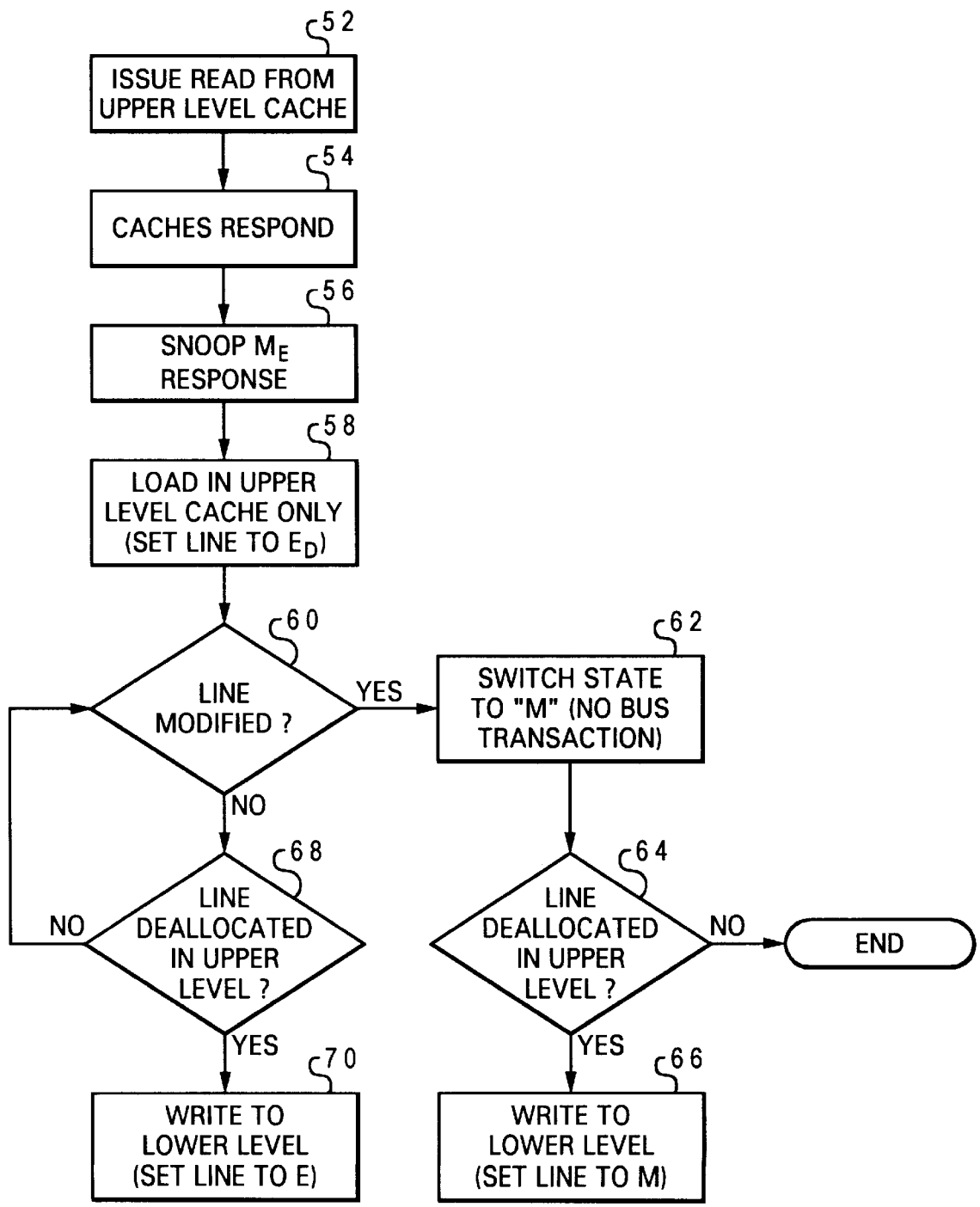
FIG. 5 is a chart illustrating the logic flow according to one embodiment of the present invention.

The logic flow for this implementation is shown in FIG. 5. First, a read request is issued from an upper level cache (52). After the caches respond (54), a snoop response is formulated to indicate that the line can be loaded in the $E_D$ state (56). The cache line is then loaded (only) into the upper level cache, and set to the $E_D$ state (58). If the line is subsequently modified (60), then the upper level cache can switch to the M state with no bus transaction (62). When the line is thereafter deallocated (64), it is written to the lower level and the state there set to M (66). If the line is not modified but still deallocated (68), it is written to the lower level cache but the state there is set to E (70).

The present invention is particularly useful in conjunction with large lower level caches. Furthermore, with the foregoing implementation, it is not necessary to have snoop filtering along vertically-aligned caches.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of maintaining cache coherency in a computer system having a plurality of processing units, each processing unit having a multi-level cache hierarchy, comprising the steps of:

first loading a requested value into an upper level cache of a processing unit without loading it into any other cache of the computer system;

first marking a cache line in the upper level cache as containing the value exclusive of all other caches of the computer system;

evicting the value from the upper level cache;

in response to said evicting step, second loading the value into a lower level cache of the processing unit;

determining at the lower level cache that the cache line of the upper level cache contained the value exclusive of all other caches of the computer system; and in response to said determining step, second marking a cache line in the lower level cache as containing the value exclusive of all other caches in other processing units of the computer system.

2. The method of claim 1 further comprising the step of third loading the value back into the upper level cache from the lower level cache after said evicting and second loading steps, in response to a further read request for the value from the upper level cache.

3. The method of claim 2 further comprising the steps of:

deallocating a cache line of the lower level cache containing the value in response to said third loading step; and third marking a cache line in the upper level cache as containing the value exclusive of all other caches of the computer system.

4. The method of claim 3 further comprising the step of selectively programming the upper level cache to provide said third marking step when the value is loaded into the upper level cache from any cache associated with the processing unit.

5. The method of claim 1 wherein said first loading step loads the value from a system memory device of the computer system.

6. The method of claim 1 wherein said first loading step loads the value from an intervening cache of another processing unit.

7. The method of claim 6 further comprising the step of selectively programming the upper level cache to provide said first marking step when the value is loaded into the upper level cache from any intervening cache of another processing unit.

8. The method of claim 1 wherein said first loading step loads the value from another cache associated with the processing unit.

9. The method of claim 8 further comprising the step of selectively programming the upper level cache to provide said first marking step when the value is loaded into the upper level cache from any cache associated with the processing unit.

10. A computer system comprising:

a system memory device;

a plurality of processing units each having a multi-level cache hierarchy;

bus means for interconnecting said processing units and said system memory device; and cache coherency means for first marking a cache line in an upper level cache of a given processing unit as containing a value exclusive of all other caches of the computer system when the value is first loaded into said upper level cache without loading the value into any other cache of the computer system and further, upon eviction of the value from said upper level cache, for second marking a cache line in a lower level cache of said given processing unit as containing the value exclusive of all other caches in other processing units of the computer system when the value is second loaded into said lower level cache in response to eviction of the value from said upper level cache.

11. The computer system of claim 10 wherein said cache coherency means further includes means for loading the value into said upper level cache in response to a read request from said upper level cache.

12. The computer system of claim 10 wherein said cache coherency means further includes means for third loading the value back into the upper level cache from the lower level cache after the value has been evicted from said upper level cache and loaded into said lower level cache, in response to a further read request for the value from said upper level cache.

13. The computer system of claim 12 wherein said cache coherency means further includes means for deallocating a cache line of said lower level cache containing the value in response to said third loading of the value back into said upper level cache, and for third marking a cache line in said upper level cache as containing the value exclusive of all other caches of the computer system.

14. The computer system of claim 13 wherein said cache coherency means is selectively programmed to provide said third marking of said cache line when the value is loaded into said upper level cache from any cache associated with said given processing unit.

15. The computer system of claim 10 wherein said cache coherency means loads the value from said system memory device.

16. The computer system of claim 11 wherein said cache coherency means loads the value from an intervening cache of another processing unit.

17. The computer system of claim 16 wherein said cache coherency means is selectively programmed to provide said first marking when the value is loaded into said upper level cache from any intervening cache of another processing unit.

18. The computer system of claim 11 wherein said cache coherency means loads the value from another cache associated with said given processing unit.

19. The computer system of claim 18 wherein said cache coherency means is selectively programmed to provide said first marking when the value is loaded into said upper level cache from any cache associated with said given processing unit.

20. The computer system of claim 11 wherein each of said processing units has at least three cache levels, including a lower level lookaside cache.

* * * * *

UNITED STATES PATENT AND TRADEMARK OFFICE
CERTIFICATE OF CORRECTION

PATENT NO. : 6,314,498 B1
DATED : November 6, 2001
INVENTOR(S) : Arimilli et al.

It is certified that error appears in the above-identified patent and that said Letters Patent is hereby corrected as shown below:

<u>Title page,</u>
In the title, delete the word "LEVER" and replace it with the word -- LEVEL --.

<u>Column 1,</u>
Line 4, delete the word "LEVER" and replace it with the word -- LEVEL --.

Signed and Sealed this

Sixteenth Day of April, 2002

*Attest:*

*Attesting Officer*

JAMES E. ROGAN
*Director of the United States Patent and Trademark Office*